(12) United States Patent
Welken et al.

(10) Patent No.: US 12,076,738 B2
(45) Date of Patent: Sep. 3, 2024

(54) METHOD AND APPARATUS FOR PAINTING (71) Applicant: Bayerische Motoren Werke Aktiengesellschaft, Munich (DE)

(72) Inventors: Aubrey Welken, Pretoria (ZA); Juliane Zeissler, Munich (DE); Steffi Zimmermann, Munich (DE); Anja Zwerenz, Kitzscher (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 305 days.

(21) Appl. No.: 17/628,030

(22) PCT Filed: Jun. 22, 2020

(86) PCT No.: PCT/EP2020/067277
§ 371 (c)(1),
(2) Date: Jan. 18, 2022

(87) PCT Pub. No.: WO2021/013449
PCT Pub. Date: Jan. 28, 2021

(65) Prior Publication Data
US 2022/0266284 A1  Aug. 25, 2022

(30) Foreign Application Priority Data
Jul. 19, 2019  (DE) ..................... 10 2019 119 613.2

(51) Int. Cl.
*B05B 13/04* (2006.01)
*B05B 12/04* (2006.01)
(Continued)

(52) U.S. Cl.
CPC .......... *B05B 13/0452* (2013.01); *B05B 12/04* (2013.01); *B05D 1/02* (2013.01);
(Continued)

(58) Field of Classification Search
CPC .................................. B05D 1/02; B05D 5/066
See application file for complete search history.

(56) References Cited

U.S. PATENT DOCUMENTS

| 4,532,148 A | 7/1985 | Vecellio |
| 5,110,617 A | 5/1992 | Gundling et al. |

(Continued)

FOREIGN PATENT DOCUMENTS

| CN | 101758012 A | 6/2010 |
| CN | 101955594 A | 1/2011 |

(Continued)

OTHER PUBLICATIONS

Chinese Office Action issued in Chinese application No. 202080037628.2 dated Feb. 2, 2023, with English translation (Eight (8) pages).

(Continued)

*Primary Examiner* — Nathan T Leong
(74) *Attorney, Agent, or Firm* — Crowell & Moring LLP (57) ABSTRACT

A method for painting a skin component of a vehicle includes conveying the skin component along a conveying direction. The method further includes controlling first and second painting robots by a control installation such that a first spraying tool of the first painting robot applies a first paint of a first color in a first sub-region and a second spraying tool of the second painting robot applies a second paint of a second color in a second sub-region, where in an overlap region within which the first sub-region overlaps the second sub-region, the first paint is applied over the second paint such that a quantity of the first paint is kept constant perpendicular to a painting direction and is reduced along the painting direction such that a color gradient from the first color to the second color is formed in the overlap region.

9 Claims, 1 Drawing Sheet

(51) Int. Cl.
   *B05D 1/02* (2006.01)
   *B05D 5/06* (2006.01)
   *B05D 7/14* (2006.01)
   *B25J 11/00* (2006.01)
   *B05B 15/68* (2018.01)

(52) U.S. Cl.
   CPC .............. *B05D 5/065* (2013.01); *B05D 5/066* (2013.01); *B05D 7/14* (2013.01); *B25J 11/0075* (2013.01); *B05B 15/68* (2018.02)

(56) References Cited

U.S. PATENT DOCUMENTS

| | | | |
|---|---|---|---|
| 6,777,032 B2 | 8/2004 | Ogasahara et al. | |
| 2005/0225113 A1* | 10/2005 | Svenson | B60R 13/02 296/39.1 |
| 2006/0171250 A1* | 8/2006 | Frosztega | B01F 35/56 366/241 |
| 2009/0074968 A1* | 3/2009 | Dunlop | B05D 7/577 427/259 |
| 2010/0167027 A1 | 7/2010 | Jiang et al. | |
| 2011/0014461 A1 | 1/2011 | Li et al. | |
| 2018/0099309 A1 | 4/2018 | De Fillippi et al. | |
| 2018/0250703 A1 | 9/2018 | Nakazono et al. | |

FOREIGN PATENT DOCUMENTS

| | | |
|---|---|---|
| CN | 102177002 A | 9/2011 |
| CN | 108525972 A | 9/2018 |
| DE | 10 2004 010 389 B4 | 10/2004 |
| DE | 602 12 523 T2 | 2/2007 |
| DE | 10 2014 009 945 A1 | 1/2016 |
| DE | 10 2016 112 787 A1 | 10/2016 |
| DE | 10 2016 003 916 A1 | 10/2017 |
| DE | 10 2016 014 919 A1 | 6/2018 |
| EP | 0 122 034 B1 | 10/1984 |
| EP | 1 733 799 A1 | 12/2006 |
| KR | 10-2010-0055902 A | 5/2010 |

OTHER PUBLICATIONS

PCT/EP2020/067277, International Search Report dated Sep. 8, 2020 (Two (2) pages).

German Search Report issued in German application No. 10 2019 119 613.2 dated Apr. 8, 2020, with Statement of Relevancy (Seven (7) pages).

English-language Chinese Office Action issued in Chinese application No. 202080037628.2 dated Jul. 19, 2022 (Ten (10) pages).

* cited by examiner

METHOD AND APPARATUS FOR PAINTING

BACKGROUND AND SUMMARY OF THE INVENTION

The invention relates to a method for painting an outer skin component which may in particular be a body part, for example a vehicle roof, of a motor vehicle. The invention furthermore relates to a painting station for an outer skin component of a motor vehicle.

The paintwork of a motor vehicle, in particular of a passenger motor vehicle, significantly contributes toward the aesthetic appeal of the motor vehicle and moreover also serves as a protection in relation to environmental influences. The paintwork can be composed, for example, of the painted surfaces in the exterior and moreover also in the interior, wherein the painted surfaces are most typically visible surfaces. The type and/or color, or an appeal, respectively, of the painted surface can be utilized as a feature of differentiation between different motor vehicles. Furthermore, in particular large-area exterior surfaces, or painted surfaces, respectively, can enhance the functional characteristic of the motor vehicle. Moreover, the possibilities of differentiation for a potential user of the motor vehicle can also be increased, as a result of which a unique selling proposition of the motor vehicle can be particularly accentuated.

Possibilities for painting an outer skin component, or a vehicle body, respectively, are already known from the prior art. DE 602 12 523 T2 thus shows a vehicle body painting process for painting a vehicle body which comprises an outer body portion, spaces for an engine and cargo or baggage, and an inner door portion.

Furthermore, EP0122 034 B1 shows a method for coating automobile bodies, wherein an electrostatic spray-coating system is used which utilizes displaceable rotating heads for atomizing paint to be applied to the automobile body.

Finally, DE 10 2004 010 389 B4 shows a method for wet-painting vehicle bodies, using at least two colored paints for a vehicle body with a two-tone paint scheme.

In the mentioned prior art it is at least disadvantageous that no color progression, thus a color gradient, for example from a first color to a second color, can be painted using the prior art, wherein the transition from one color to the other color is configured so as to be continuous. A further disadvantage lies in the to some extent poor integration capability into existing production lines in the production of vehicles using transport systems.

It is therefore an object of the present invention to provide a method for painting an outer skin component of a motor vehicle as well as a painting station for painting the outer skin component, by means of which method and painting station a color-progression multi-color paintwork having a color gradient can be implemented, wherein the method, and the painting station, respectively, are able to be integrated in particular in a production line on which a conveying installation transports the outer skin component.

A first aspect of the invention relates to a method according to the invention for painting an outer skin component which may in particular be a body part such as, for example, a vehicle roof and is fastened, for example, to further components of the body of a motor vehicle, in particular of a passenger motor vehicle. In the method, the outer skin component by means of a conveying system during painting is conveyed, in particular continuously, along a conveying direction, which advantageously may be substantially perpendicular to the direction of longitudinal extent of the outer skin component, through a painting station.

The painting station has at least two painting robots having in each case one spraying tool which is held on a robotic arm and by way of which paint is in each case applied, in particular sprayed, for example, to a visible region of the outer skin component.

The respective spraying tool can thus be configured in particular as a painting bell by way of which paint can be sprayed or ejected, respectively, on to the visible region. An electrostatically assisted painting method with mechanical atomizing and electrostatic depositing of the drops on the visible region can in particular be carried out by means of the painting bell. The respective spraying tool is also referred to as an applicator. The respective robotic arm is preferably able to be moved, in particular mechanically, along the three spatial directions and is situated on a rotatable plinth, for example, and preferably has at least one elbow joint, wherein the spraying tool is attached to a hand region. The spraying tool can thus be configured so as to be mounted in a manner rotatable relative to a lower arm region of the robotic arm. The respective robotic arm is thus configured for moving the spraying tool relative to the outer skin component in such a manner that paint can be applied to the visible region, the outer skin component being in particular situated in a conveying action along the conveying direction. The combination of the robotic arm and the spraying tool held thereon conjointly forms the painting robot.

The painting station is, for example, a section of a production line or an assembly line and/or an assembly belt on which the outer skin component is assembled before or after painting. The conveying system on which the outer skin component can be held on at least one further body part, for example, can be configured as a conveyor or a transport vehicle. For example, the first of the at least two robotic arms (or painting robots, respectively) in the conveying direction can be on a starboard side relative to the outer skin component, and the second of the at least two robotic arms in the conveying direction can be on the port side relative to the outer skin component such that the outer skin component by means of the conveying system can be conveyed so as to pass through between the first robotic arm and the second robotic arm, for example.

In order for a multi-color paintwork which enables in particular a color progression from a first color to at least a second (or a further) color to be able to be carried out by means of the method according to the invention, it is provided according to the invention that the at least two painting robots by way of a control installation are controlled such that the first spraying tool of the first of the at least two painting robots applies a first paint of a first color in a first sub-region of the visible region, and the second spraying tool of the second of the at least two painting robots applies a second paint in a second color in a second sub-region of the visible region, wherein in an overlap region within which the first sub-region overlaps the second sub-region the first paint is applied over the second paint and, when applying the first paint in the overlap region, the quantity of the first paint perpendicular to a painting direction, the latter coinciding in particular with the conveying direction, is kept constant and/or reduced along the painting direction, as a result of which a color gradient from the first color to the second color is formed in the overlap region.

For example, the outer skin component here can be pretreated prior to the method according to the invention; at least the visible region of the outer skin component can be primed in particular by a further paint, for example. Furthermore, the outer skin component, once the respective paint has been applied in the respective sub-region of the visible region, can also be provided with a clear coat, in particular in the region of the entire visible region, as a result of which the durability of the multi-color paintwork can in particular be increased, for example.

In other words, the method according to the invention serves for painting an outer skin component, configured in particular as a body part, of a motor vehicle, in the case of which outer skin component on at least the visible region or a visible surface, thus a region of the outer skin component which can be seen in the fully assembled state of the motor vehicle at least one paint is applied to the visible surface by means of at least two spraying tools which are held so as to be in particular at least rotatable on in each case one robotic arm which is in particular configured so as to be movable. The application of the paint here takes place while the body part is conveyed, in particular by the conveying system, along a conveying direction past the spraying tools and the robotic arms, and a control installation, or the control installation, respectively, for applying the paint to the visible surface controls the robotic arms and the spraying tools.

In order for the color progression from the first color to the second color now to be enabled, the second paint having the second color within the visible region is applied by means of the second spraying tool in the second sub-region, the first border of the latter and the second border of the latter potentially running in particular in each case so as to be perpendicular to the conveying direction.

The first robotic arm and the first spraying tool are furthermore controlled by the control installation in such a manner that the first paint having the first color on the visible region is applied in the first sub-region of which at least one border runs in particular so as to be likewise perpendicular to the conveying direction, this border advantageously lying in the, in particular first, overlap region. Additionally or alternatively, the borders of at least one of the sub-regions can also run so as to be perpendicular to the conveying direction and/or in an arbitrary direction in relation to the conveying direction. The control installation controls the painting robots as a function of the border profile.

Furthermore, for example, a third painting robot could be controlled by the control installation in such a manner that a third paint having a third color is applied to the visible region, for example in a third sub-region, the border of the latter in turn likewise advantageously running so as to be perpendicular to the conveying direction, and this border moreover advantageously potentially lying in a second overlap region. The respective robotic arm and the spraying tool assigned to the robotic arm here can advantageously be controlled in such a manner that a color distribution, and thus a quantity of sprayed paint, for example per unit of area, can be varied so as to correspond to the requirement set for the multi-color paintwork. In the example of the vehicle roof, the respective color, thus the first color and/or the second color and/or the third color in the vehicle transverse direction, for example, can have a consistent color which is identical across the entire region of extent, and in the vehicle longitudinal direction, the latter in the example coinciding with the conveying direction, be applied in such a manner that a respective intensity of the respective color can be increased and/or decreased. This means that the quantity of paint applied per surface can be kept constant in the transverse direction by the method according to the invention, for example, whereas a color gradient of the respective color can be applied along the conveying direction. Additionally or alternatively, the mentioned directions can also be swapped when applying the paints, the painting direction thus being able to be chosen in an arbitrary manner, so to speak. The color gradient here is understood to be the continuous variation of a color. The first color is advantageously different from the second color and the third color, the latter in turn being different from the second color.

In other words, the first paint is applied to the first sub-region and in particular the overlap region of the latter such that the intensity of the first color on the outer skin component decreases in relative terms, for example along the conveying direction, and transversely to the conveying direction, that is to say in each case across the width of the visible region, is constant relative to the conveying direction, as a result of which the first color along the conveying direction loses intensity in a uniform manner across the entire width toward the second sub-region.

The invention here is based on the concept that in the contrasting roof paintwork to date, this meaning vehicle paintwork in which the vehicle roof of the motor vehicle has a color which differs in comparison to the remainder of the motor vehicle, the vehicle roof in the longitudinal direction, thus the conveying direction which corresponds to the travel direction of the completely painted vehicle, is painted by means of so-called line tracking using two painting robots which are in each case formed from a robotic arm and a spraying tool, for example. In the case of a standard painting station, the robotic arms in the first place are not configured for completely reaching the visible region, configured as a vehicle roof for example, by way of the spraying tool, in particular in the case of an almost completely assembled body being conveyed through the painting station, for example. This means that a robotic arm which is disposed on a driver side of the vehicle to be formed from the body typically does not reach the passenger side of the associated vehicle roof. Likewise, a painting robot mounted on the passenger side may not be capable of reaching the driver side of the vehicle roof such that the paint can be applied thereto when the body part is conveyed through the painting station.

For the method according to the invention this means that modifications are advantageous not only on the control installation, or on a software which is executed on the control installation, the latter being particularly advantageously configured as an electronic computing installation, but modifications to a hardware, in particular the robotic arms, are also advantageous. For example, the respective lower arm region of the respective painting robot by a suitable extension element can in each case be extended in such a manner that the respective robotic arm is capable of reaching the visible region, across the entire width transverse to the conveying direction, in such a manner that the respective spraying tool assigned to the respective robotic arm can apply the paint, as a result of which the method according to the invention can be carried out in a particularly advantageous manner. The extension, for example in particular on a hand axis of the respective robotic arm, here can be carried out by means of an adapter, for example, wherein—depending on the outer skin component—an extension of the hand axis by 100 millimeters can suffice in order to enable the spraying tool access in order to apply the paint in the entire visible region, so to speak.

By the method according to the invention it is thus possible that painting, thus the application of one of the paints having one of the colors, wherein the colors advantageously are in each case different, as opposed to a current contrasting roof paintwork, or the application of the paint, respectively, takes place transversely to the conveying direction of the outer skin component and not along the conveying direction, as a result of which a particularly harmonic color progression can be represented in particular from the front to the rear in the case of the vehicle roof, for example. Alternatively, the color progression on the vehicle roof can also be configured from the driver side to the passenger side, for example.

A further advantage of the method according to the invention lies in that, by adapting the software executed by the control installation, simultaneous loading and painting of different paints can be carried out, the paints being in particular configured as base coats. It is thus a further advantage of the method that different colors can, in particular simultaneously, be charged and/or loaded at the respective robotic arms having the respective associated spraying tool, thus at the respective painting robot, within the painting procedure, or during painting of a vehicle, respectively.

In the method according to the invention, it is particularly advantageously possible by way of the control installation that adhering to a specific painting sequence of the at least two, in particular for example three, different paints and thus of the at least two different colors can be adhered to, as a result of which a desired aesthetic appeal, in particular of a contrasting roof, can be achieved in a particularly advantageous manner.

A further advantage of the method according to the invention lies in that a novel aesthetic appeal of the color of the outer skin component can be achieved as a result of the method. A high degree of customizing of the motor vehicle is furthermore possible as a result of the method according to the invention, this potentially being a particularly great unique selling point of the motor vehicle. A further advantage of the method thus lies in that targeted color progressions and chains of progressions which enable an innovative visual appearance of the paint, in particular having an appealing premium characteristic, can be achieved as a result of the new form of the painting technology that is able to be implemented by the method. Cycling within an existing production sequence can be adhered to in particular by virtue of the conveying of the conveying installation that takes place during the painting, or the application of the paints, respectively. The paintwork produced by the method according to the invention here can be selected by a future user of the vehicle, for example by means of a configuration on a website, for example.

In an advantageous design embodiment of the invention, a third painting robot of the at least two painting robots, the third painting robot having a third spraying tool held on the third robotic arm, applies a third paint of a third color in a third sub-region of the visible region. In other words, the at least two robotic arms having the respective spraying tool assigned in each case to the respective robotic arm, and the third robotic arm having the third spraying tool, are controlled by the control installation. The painting robots in the method here are controlled in such a manner that the visible region of the outer skin component preferably has a multi-color paintwork which after the application of the paints has in particular a continuous color progression. The third robotic arm here is advantageously configured in a manner analogous to that of the first and/or the second robotic arm. The third spraying tool is advantageously configured in a manner analogous to that of the first and/or of the second spraying tool. By using three robotic arms, a three-colored color-progression aesthetic appeal can be generated in a particular advantageous manner, in particular within a conveying time. The conveying time here advantageously corresponds to a cycle time of the production line of which the painting station may be part. The conveying time is thus the time which is required for conveying the external skin component through the painting station by means of the conveying system.

In an advantageous design embodiment of the invention, the first sub-region is conveyed along the conveying direction through the painting station before the second sub-region, and/or the second sub-region before the third sub-region, and/or at least one border of the first sub-region and/or of the second sub-region and/or of the third sub-region runs so as to be substantially perpendicular to the conveying direction, wherein the length of the respective border may correspond in particular to the width of the visible region perpendicular to the conveying direction at the position of the border. In other words, the third sub-region is advantageously contiguous to the second sub-region which in turn is contiguous to the first sub-region. Additionally or alternatively, the respective sub-region occupies the entire width of the visible region relative to the conveying direction. In the example of the vehicle roof, the second sub-region in the vehicle longitudinal direction is contiguous to the first sub-region, and the third sub-region is contiguous to the second sub-region. The respective sub-region in the vehicle transverse direction preferably occupies the entire width of the vehicle roof. This results in the advantage that, in particular by virtue of the respective border which runs transversely to the conveying direction and, in the case of the vehicle roof for example, thus along the vehicle transverse direction, the respective paint in the respective color can thus be applied to the outer skin component in a particularly defined manner, as a result of which the multi-color paintwork can be configured in a particularly advantageous manner.

In a further advantageous design embodiment of the invention, the at least one border of the first sub-region lies in a first overlap region which overlaps the second sub-region in particular along the conveying direction and/or the at least one border of the second sub-region lies in a second overlap region which overlaps the third sub-region in particular along the conveying direction. In other words, the first sub-region has a first overlap region which is additionally part of the second sub-region such that the first color as well as the second color by applying the first lacquer and the second lacquer, respectively, can be visible at least in the first overlap region on the outer skin component. In an analogous manner, the second overlap region is part of the second sub-region as well as part of the third sub-region, wherein the overlap region, in a manner analogous to the first overlap region, thus can have the second and the third color. The first overlap region here can also overlap the second overlap region, as a result of which a particularly continuous color progression from the first color in the first sub-region, via the second color in the second sub-region, to the third color of the third sub-region can be achieved with the aid of the first overlap region and with the aid of the second overlap region. In the example of the vehicle roof, the respective overlap region along the conveying direction here is advantageously configured across the entire width of the external skin component, this however likewise applying to any arbitrary outer skin component such as also an engine hood, for example. As a result of the at least two overlap regions, the advantage arises that an, in particular continuous, color progression from in each case one of the colors to a further color of the adjacent sub-region can be configured.

In a further advantageous manner the second paint in the second sub-region is applied first, thus before the first paint in the first sub-region, and furthermore before the third paint in the third sub-region, for example. This applies in particular when the second sub-region on the visible region is disposed between the first sub-region and the third sub-region. In other words, the painting takes place using the second color first. By applying the second paint and thus the second color first, thus before applying the first and/or, for example additionally before applying the third paint, the advantage arises that a color transition from the first color to the second color and from the latter to the third color can be implemented in a particularly advantageous manner as a result of which the color gradient of the multi-color paintwork can be configured in a particularly advantageous manner.

In a further advantageous design embodiment of the invention, in the second overlap region the third paint having the third color is applied over the second paint and/or over the first paint, wherein when applying the third paint the quantity thereof perpendicular to the conveying direction is kept constant across the width of the third sub-region and increased along the conveying direction, as a result of which an, in particular continuous, color gradient from the second color and/or the first color to the third color is formed in the second overlap region. In other words, a color gradient analogous to that of the first overlap region can be formed in a particularly advantageous manner. By applying the third paint in the overlap region, a color gradient is formed which across the width of the outer skin component relative to the color direction has in each case a constant hue and along the conveying direction transitions from the second color, in particular continuously, to the third color.

By applying the first paint over the second paint and varying the quantity in a corresponding manner, and/or by applying the third paint over the second paint and/or the first paint and varying the quantity in a corresponding manner, a color gradient from the first to the second color as well as from the second to the third color and/or from the first to the third color, while trespassing the second color, becomes possible in a particularly advantageous manner.

In a further advantageous design embodiment of the invention, the first color is a metallic color or a solid color, and/or the second color is a metallic color or a solid color, and/or the third color is a metallic color or a solid color. In other words, if a respective one of the colors can be a metallic color the respective paint is a metallic paint, for example, as a result of which a metallic shine and/order metallic luster of the respective color can be achieved. Additionally or alternatively, the respective color is a solid color or a base coat which can be configured so as to be in particular matte and/or in particular shiny but does not have a metallic paint effect. By way of the method according to the invention and by using a corresponding color, it can be possible in a particularly advantageous manner, for example in the case of the vehicle roof, that a first metallic color which begins at the windshield transitions by way of the second metallic color to a solid hue, the latter representing the hue of a spoiler additionally mounted to the vehicle roof, for example. It has been demonstrated to be an advantage here that, should a combination of a metallic color and a solid color be used, the solid hue as a solid color, or the corresponding paint, respectively, is to be applied as the last paint to the visible region so as to obtain a particularly advantageous multi-color paintwork.

In a further advantageous design embodiment of the invention, the respective movement of the respective robotic arm and/or of the respective spraying tool held by the robotic arm, is synchronized with the movement of the outer skin component caused by the conveying system, the latter movement being in particular in the conveying direction of the outer skin component, in particular for applying straight paint tracks perpendicularly and/or transversely to the conveying direction. In other words, the controlling of the painting robot, the latter being formed by the robotic arm and the spraying tool held thereon or disposed thereon, respectively, takes place in such a manner that the paint, while the outer skin component is moved through the painting station by means of the conveying system, such that in a manner perpendicular to the conveying direction, in particular across the entire width of the visible region, the possibility is provided for carrying out a straight track formed from the paint, or for keeping the quantity of the applied paint constant in each case across the entire width and/or length in a corresponding region. The advantage arises here that the multi-color paintwork can be performed in a particularly precise manner.

In a further advantageous design embodiment of the invention, a fourth robotic arm having a fourth spraying tool is kept ready, the fourth robotic arm and the fourth spraying tool in the event of a failure of one of the other robotic arms and/or spraying tools being able to be used by the control installation as the failed robotic arm and/or the failed spraying tool. In other words, a further robotic sprayer which is formed by the fourth robotic arm and the fourth spraying tool is kept ready, the spraying robot thus being kept ready as a so-called backup or replacement device such that the production process in the painting station does not have to be stopped in the event of one of the other painting robots failing and such that a continuous conveyance of outer skin components through the painting station continues to be possible, this being a particular advantage when using the method in a production process of the motor vehicle associated with the outer skin component, for example.

A second aspect of the invention relates to a painting station for an outer skin component, the latter potentially being in particular a body part, of a motor vehicle which is in particular configured as a passenger motor vehicle, having a conveying system for conveying the outer skin component along a conveying direction through the painting station, the painting station having at least two spraying tools held in each case by a robotic arm and by way of which paint is able to be applied, in particular in a defined manner, to a visible region of the outer skin component.

In order for a multi-color paintwork, having in particular continuous color transitions between individual colors, to be able to be generated in a particularly advantageous manner by the method, it is provided according to the invention that the painting station has a control installation which controls the at least two robotic arms having the respective spraying tool as well as, in particular additionally, a third robotic arm having a third spraying tool, for applying the paint. The painting station here is configured in such a manner that the first spraying tool is configured for applying a first paint of a first color in a first sub-region of the visible region, the second spraying tool is configured for applying a second paint of a second color in a second sub-region of the visible region. Additionally, the third spraying tool could be configured for applying a third paint of a third color in a third sub-region of the visible region. In an overlap region within which the first sub-region overlaps the second sub-region here, the first paint is applied over the second paint and, when applying the first paint in the overlap region, the quantity of the first paint perpendicular to the painting direction, which is in particular congruent with the conveying direction, is kept constant and/or reduced along the painting direction, as a result of which a color gradient from the first color to the second color is formed in the overlap region.

In a further advantageous design embodiment of the invention, the first and/or the second and/or the third robotic arm along a respective hand axis have/has an extension element. In other words, in the respective lower arm region or hand region, where the respective spraying tool is held on the robotic arm, an extension element is provided, the latter serving in particular so that the outer skin component in the visible region thereof can have an application of paint from each of the first, second and third robotic arm, respectively, in particular transversely to the conveying direction, thus in the width of the visible region.

In a further advantageous design embodiment of the invention, an approach rotation angle of at least one of the spraying tools relative to the robotic arm on which the spray tool is held is variable by the control installation such that the quantity of the paint which is able to be applied to the respective associated sub-region is able to be specified. In other words, an angle of the spraying tool, or of the applicator, respectively, relative to the visible region can be adjusted by the approach rotation angle which can also be referred to as a painting angle, for example, such that the quantity of the paint can be varied in the respective sub-region, because a larger area of the sub-region can be sprayed per unit of time by varying the angle, for example, as a result of which an identical quantity of paint is distributed across a larger surface.

The advantages of the first aspect of the invention here are to be considered advantages of the second aspect of the invention and vice versa.

Further features of the invention result from the claims, the FIGURE and the description of the FIGURE. The features and combinations of features which are mentioned above in the description and the features and combinations of features which are mentioned in the description of the FIGURE in the following text and/or are shown in the FIGURE alone can be used not only in the respectively specified combination, but rather also in other combinations or on their own.

The invention will now be explained in more detail by means of a preferred exemplary embodiment and with reference to the drawing.

DETAILED DESCRIPTION OF THE DRAWING

Figure 1:
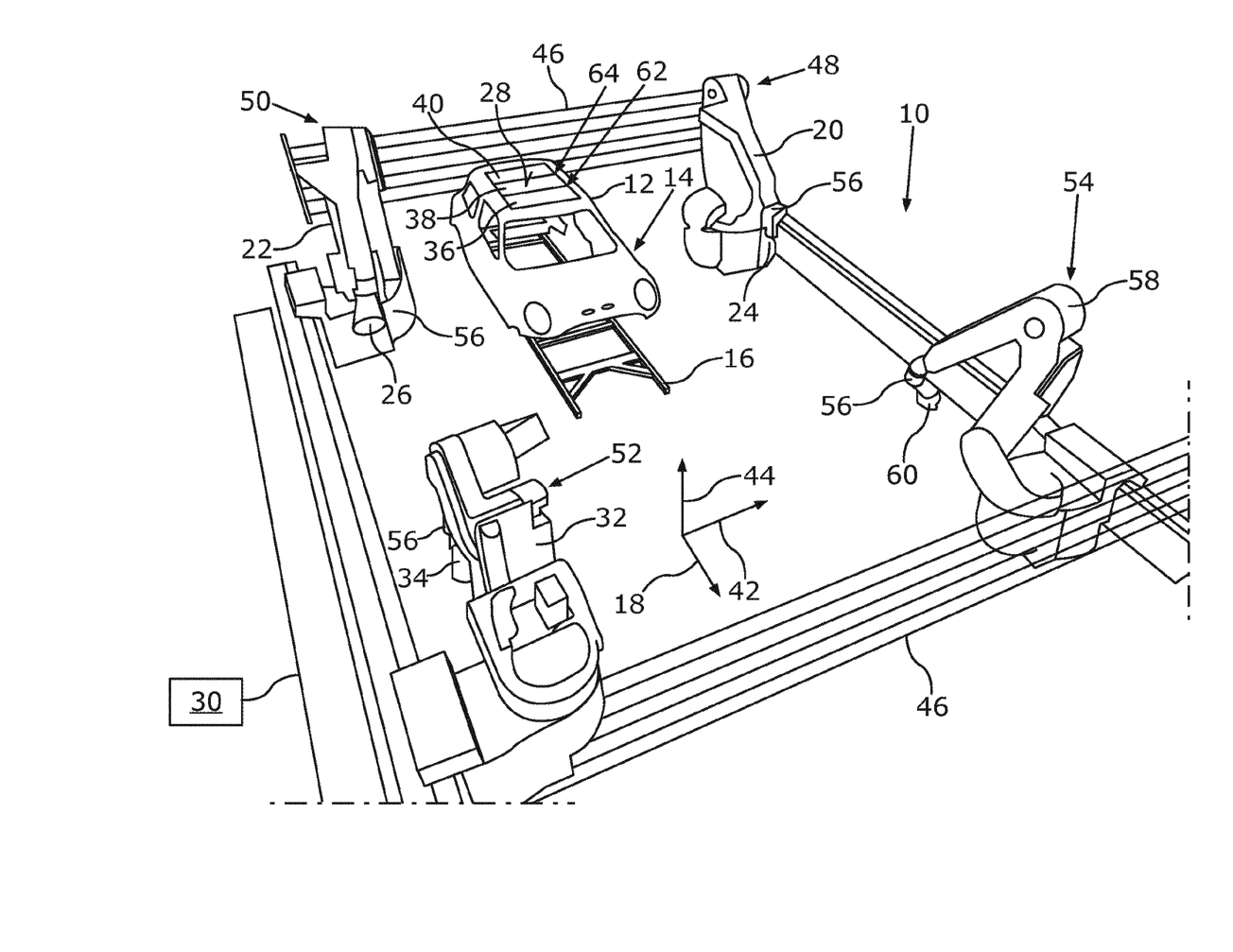
The FIGURE shows a schematic perspective view of a painting station through which an outer skin component of a motor vehicle is conveyed during painting.

The only FIGURE, in a schematic perspective view, shows a painting station 10 for an outer skin component 12, in particular a body 14, of a motor vehicle, the painting station 10 having a conveying system 16 for conveying the outer skin component 12 along a conveying direction 18 through the painting station 10. The painting station 10 here comprises at least two painting robots 48, 50 having in each case one spraying tool 24, 26 which is held on a robotic arm 20, 22 and by way of which paint can in each case be applied, or is in each case able to be applied, in particular in a defined manner, respectively, to a visible region 28 of the outer skin component 12.

In order for a multi-color paintwork to be able to be carried out in a particularly advantageous manner by the painting station 10, or by a method which is able to be carried out by means of the painting station 10, in which in particular continuous conveying of the outer skin component 12, or of the body 14, through the painting station 10 takes place, in particular in a continuous manner, while applying the paint, the painting station 10 has a control installation 30. The at least two painting robots 48, 50 by the control installation 30 are controlled such that the first spraying tool 24 of the first of the at least two painting robots 48 applies a first paint of a first color in a first sub-region 36 of the visible region 28, and the second spraying tool 26 of the second of the at least two painting robots 50 applies a second paint of a second color in a second sub-region 38 of the visible region 28. In an overlap region 62, within which the first sub-region 36 here overlaps the second sub-region 38, the first paint is applied over the second paint. When applying the first paint in the overlap region, the quantity of the first paint perpendicular to a painting direction, which corresponds in particular to the conveying direction 18, is kept constant and/or reduced along the painting direction, as a result of which a color gradient from the first color to the second color is formed in the overlap region 62.

Furthermore, in addition to the at least two robotic arms 20 and 22 having the respective spraying tools 24, 26, a third robotic arm 32 having a spraying tool 34 held on a third robotic arm 32 is furthermore able to be controlled by means of the control installation 30 in order for the paint to be applied.

This means that the control installation 30 is configured for actuating actuators which are contained in the respective robotic arms 20, 22 and 32, for example, such that the robotic arms 20, 22, 32, 58 and the spraying tools 24, 26, 34, 60 held thereon are able to be moved in such a manner that the respective paint is able to be applied, as is provided for a painting process or for painting the outer skin component 12, respectively. The first spraying tool 24 here is configured for applying a first paint of a first color in a first sub-region 36 of the visible region 28, the second spraying tool 26 is configured for applying a second paint of a second color in a second sub-region 38, and the third spraying tool 36 is configured for applying a third paint of a third color in a third sub-region 40 of the visible region 28.

As a result of the painting station 10 shown, it is thus possible in a particularly advantageous manner on the outer skin component 12, the latter in the exemplary embodiment shown being configured as the vehicle roof of the body 14, to paint the visible region 28 of the outer skin component 12 in such a manner that a color transition from the first color by way of the second color to the third color is enabled. The robotic arms 20, 22 and 32 here, having the spraying tools 24, 26, and 34 thereof which are in each case held on the robotic arms 20, 22, and 32 and which are configured as applicators for the paint, for example, can be controlled, in particular by the control installation 30, in such a manner that the color progression is carried out or painted, respectively in particular in a continuous manner.

An exterior design of a particularly high quality for the motor vehicle to be produced from the body 14 can thus be generated in a particularly advantageous manner by the painting station 10 shown, wherein the motor vehicle which is configured in particular as a passenger motor vehicle has a particularly premium look and feel or may have a particularly high degree of functionality, for example.

A method for painting the outer skin component 12 can be carried out by the painting station 10 shown, in which method the outer skin component 12 by means of the conveying system 16 is conveyed, in particular continuously, along the conveying direction 18, the latter being substantially perpendicular to the direction of longitudinal extent of the outer skin component 12, through the painting station 10 during the application of the paint or paints, respectively, thus the first and/or the second and/or the third paint. In the method, the respective paint by the at least two spraying tools 24 and 26, respectively, which are in each case held on the robotic arm 20 and 22, respectively, is applied to the visible region 28 of the outer skin component in at least the first sub-region 36 and/or the second sub-region 38, applied here potentially being understood to be in particular spraying or similar.

In the method, the third robotic arm 32 having the third spraying tool 34 held thereon is advantageously controlled by the control installation 30 which also controls the first robotic arm 20 having the first spraying tool 24 and the second robotic arm 22 having the second spraying tool 26, wherein the first spraying tool 24 is configured for applying the first paint of the first color in the first sub-region 36 of the visible region 28, and the second spraying tool 26 is configured for applying the second paint of the second color in the second sub-region 38 of the visible region 28, and the spraying tool 34 is configured for applying the third paint of the third color in the third sub-region 40 of the visible region 28.

The first robotic arm 20 having the first spraying tool 24 held thereon forms a first painting robot 48, the second robotic arm 22 having the second spraying tool 26 held thereon forms a second painting robot 50, and the third robotic arm 32 having the third spraying tool 34 held thereon forms a third painting robot 52.

The conveying direction 18 in the exemplary embodiment shown coincides with the vehicle longitudinal direction. The vehicle transverse direction 42 is thus perpendicular to the conveying direction 18. The vehicle vertical direction 44 is likewise illustrated by an arrow.

In order for a processing time to be able to be particularly advantageously adhered to by the method for painting the outer skin component 12, for example, the painting station 10 has light barriers 46. Entering and/or exiting of the body 14 which by the conveying system 16 is conveyed along the conveying direction 18 can be determined by means of the light barriers 46, as a result of which the processing time can be adapted to a production line (not shown) of which the painting station 10 is a part, for example. Monitoring of the method or of the painting station 10, respectively, can furthermore be carried out by means of the light barriers 46 such that the respective painting robot 48, 50, 52, 54 can be switched off should the latter still be spraying as soon as one of the light barriers 46 is interrupted by the body 14, for example.

In order for the respective painting robot 48, 50 and/or 52 to be able to reach the entire width along the vehicle transverse direction 42 of the visible region 28, or of the respective sub-region 36, 38, 40, respectively, the respective painting robot 48, 50 and 52, or the respective robotic arm 20, 22 and 34, respectively, can comprise a respective extension element 56. The respective extension element 56 here is a respective extension of the respective painting robot 48, 50, 52, or of the respective robotic arm 20, 22, 32, respectively.

An approach rotation angle of at least one of the spraying tools 24, 26, 34 relative to the robotic arm 20, 22, 32 on which the spraying tool 24, 26, 34 is held, can advantageously be varied by the control installation 30 such that the quantity of the paint which is able to be applied, or is applied, respectively, to the respective associated sub-region 36, 30, 40 is specified, or able to be specified, respectively. This means that by rotating the respective spraying tool 24, 26, 34 by an approach rotation angle, in particular relative to the visible region, the quantity per unit area in a region of the respective sub-region 36, 38, 40 can be varied in such a manner that an intensity of the respective color, thus of the first or the second or the third color, respectively, decreases or increases, respectively, along the region, in particular in a respective overlap region 62, 64. This takes place in that the number of color particles or paint particles, respectively, of the respective paint precipitating on the visible region can be varied by a variation of the approach rotation angle relative to the visible surface, i.e., the visible region 28, of the outer skin component 12.

A fourth robotic arm 58 is advantageously kept ready, which robotic arm 58 having a fourth spraying tool 60 held thereon, in particular a fourth painting robot 54, is kept ready in the painting station 10. This fourth painting robot 54 in the event of a failure of one of the other robotic arms 20, 22, 32 and/or spraying tools 24, 26, 34, or of one of the other painting robots 48, 50, 52, respectively, can be used by the control installation 30 as a replacement for the failed painting robot 48, 50, 52.

The method here is advantageously carried out such that the control installation 30 controls the second robotic arm 22 and the second spraying tool 26 such that the second paint of the second color within the visible region 28 is applied in the second sub-region 38, wherein the first border of the latter and the second border of the latter run in each case so as to be perpendicular to the conveying direction 18 and thus parallel to the vehicle transverse direction 42. To this end, the second paint is advantageously also applied before the first and the third paint, that is to say that the sequence of the application of the individual paints can be predefined.

To this end, the first sub-region 36 along the conveying direction 18 advantageously lies before the second sub-region 38 and/or the second sub-region 38 before the third sub-region 40, such that the conveyance through the painting station 10 establishes a defined sequencing of the sub-region 36, 38, 40, the sub-regions 36, 38, 40 being particularly mutually contiguous, that is to say that the first sub-region 36 is contiguous to at least the second sub-region 38, or the first sub-region 36 and the second sub-region 38 advantageously form a first overlap region 62, respectively. The second sub-region 38 is contiguous to at least the third sub-region 40, or the second sub-region 38 and the third sub-region 40 form a second overlap region 64, respectively. The first overlap region 62 and the second overlap region 64 here can also overlap one another. The respective overlap of the respective sub-regions 36, 38, 40 here is in particular a function of the desired color transitions of the multi-color paintwork of the outer skin component 12 of the body 14 of the motor vehicle that can be implemented by the method or by the painting station 10, respectively.

In particular after the application of the second paint, the first paint having the first color, by means of the control installation 30 controlling the first robotic arm 20 and the first spraying tool 24, is applied to the visible region 28 in the first sub-region 36, for example by spraying and/or electrostatic effects or a further painting method. The type of the painting method is freely selectable and depends on the properties of the respective paint (first, second, third).

When applying the first paint over the second paint, the quantity along the vehicle transverse direction 42 in the first overlap region 62, or in the first sub-region 36 and/or the second sub-region 38, respectively, is applied in such a manner that the quantity is kept constant across the width, thus along the vehicle transverse direction 42, whereas the quantity of the first paint is reduced in the conveying direction 18 such that the second paint is able to shine through, wherein this is advantageously carried out in such a manner that a continuous color transition, thus a so-called color gradient, from the first color to the second color is implemented. The application of the third paint over the second paint and/or over the first paint is performed in an analogous manner; when applying the third paint the quantity thereof perpendicular to the conveying direction, thus in the vehicle transverse direction 42 on the visible region 28, is thus kept constant whereas the quantity of the third paint is increased along the conveying direction 18, as a result of which an, in particular continuous, color gradient from the second color and/or the first color to the third color is formed in the second overlap region 64, thus in the second sub-region 38 and the third sub-region 40, respectively.

In other words, the third painting robot 52 by means of the control installation 30 is controlled in such a manner that, by way of the control unit, the third paint having the third color is applied to the visible region 28 in the third sub-region 40, of which at least one border runs so as to be perpendicular to the conveying direction 18 and this border lies in the second overlap region 64. Furthermore, the second sub-region 38 along the conveying direction 18 in the second overlap region 64 overlaps the third sub-region 40, and in the second overlap region 64 the third paint is applied over the second paint and/or the first paint. When applying the third paint here, the quantity of the latter perpendicular to the conveying direction can remain constant (vehicle transverse direction 42) and be increased along the conveying direction 19, as a result of which the continuous color gradient can be generated. Depending on the choice of the painting direction which in the exemplary embodiment is oriented so as to be the same as the conveying direction 18, the color progression can be configured along an arbitrary direction on the outer skin component 12.

The first color is advantageously a metallic color, and the first paint is thus a metallic paint, or the first color is a solid color and the paint is thus a solid paint, respectively. Additionally or alternatively, the second color is a metallic color and the second paint is thus a metallic paint, or the second color is a solid color and the second paint is thus a solid paint. Additionally or alternatively, the third color is a metallic color and the third paint is thus a metallic paint, and/or the third color is a solid color and the third paint is thus a solid paint. As a result, color transitions from a first metallic paint to a second metallic color and to a solid color can be able to be implemented, or the solid color may also be the central color and thus the second color, and the multi-color paintwork can thus transition from a metallic color to a solid color and back to a metallic color. Arbitrary combinations can be implemented here. The at least one solid color here is advantageously applied after the at least one metallic color, this potentially leading to a better color progression.

If one of the painting robots 48, 50, 52 or 54, respectively, fails, the spraying tool 24, 26, 34, 60 can in each case be prepared by means of purging the applicator which is in each case assigned to the robotic arm 20, 22, 32, 58 such that the color can be changed in particular in the ongoing operation, on-the-fly, so to speak, thus while the body 14 by means of the conveying system 10 is conveyed through the production line on which the painting station 10 is disposed, for example.

The movements of the respective painting robots 48, 50, 52 and 54 can be adapted to the respective spraying behavior or painting behavior, respectively, thereof by the control installation 30.

The respective painting robot 48, 50, 52 and 54 here is able to be controlled by the control installation 30 in such a manner that the respective movement of the painting robot 48, 50, 52 and 54 is synchronized with the movement of the outer skin component 12 along the conveying direction that is caused by the conveying system 16, in particular for applying, in particular straight, paint tracks in the vehicle transverse direction, thus perpendicular to the conveying direction 18. The color progression, or the respective color gradient, respectively, from the first to the second and/or the third color, respectively, can be carried out in a particularly precise manner by synchronizing the painting robots 48, 50, 52 and 54, and a functional characteristic of the motor vehicle can simultaneously be particularly accentuated, for example.

LIST OF REFERENCE CHARACTERS

10 Painting station
12 Outer skin component
14 Body
16 Conveying system
18 Conveying direction
20 First robotic arm
22 Second robotic arm
24 First spraying tool
26 Second spraying tool
28 Visible region
30 Control installation
32 Third robotic arm
34 Third spraying tool
36 First sub-region
38 Second sub-region
40 Third sub-region
42 Vehicle transverse direction
44 Vehicle vertical direction
46 Light barrier
48 First painting robot
50 Second painting robot
52 Third painting robot
54 Fourth painting robot
56 Extension element
58 Fourth robotic arm
60 Fourth spraying tool
62 First overlap region
64 Second overlap region

What is claimed is:

1. A method for painting an outer skin component of a motor vehicle, comprising the acts of:
   conveying the outer skin component by a conveying system along a conveying direction through a painting station which has a first painting robot with a first spraying tool held on a first robotic arm and has a second painting robot with a second spraying tool held on a second robotic arm, wherein paint is applyable to a visible region of the outer skin component by the first and the second spraying tools; and controlling the first and the second painting robots by a control installation such that the first spraying tool of the first painting robot applies a first paint of a first color in a first sub-region of the visible region and such that the second spraying tool of the second painting robot applies a second paint of a second color in a second sub-region of the visible region, wherein in a first overlap region within which the first sub-region overlaps the second sub-region, the first paint is applied over the second paint and, when applying the first paint in the first overlap region, a quantity of the first paint is kept constant perpendicular to a painting direction and is reduced along the painting direction such that a color gradient from the first color to the second color is formed in the first overlap region.

2. The method according to claim 1, wherein a third painting robot with a third spraying tool held on a third robotic arm applies a third paint of a third color in a third sub-region of the visible region.

3. The method according to claim 2, wherein the first sub-region is conveyed along the conveying direction through the painting station before the second sub-region and before the third sub-region and wherein a respective border of the first sub-region, the second sub-region, and the third sub-region runs perpendicular to the conveying direction.

4. The method according to claim 2, wherein the border of the first sub-region lies in the first overlap region and the border of the second sub-region lies in a second overlap region which overlaps the third sub-region.

5. The method according to claim 4, wherein in the second overlap region the third paint is applied over the second paint or over the first paint, wherein when applying the third paint a quantity of the third paint perpendicular to the conveying direction is kept constant across a width of the third sub-region and is increased along the conveying direction such that a color gradient from the second color and/or the first color to the third color is formed in the second overlap region.

6. The method according to claim 2, wherein the second paint in the second sub-region is applied first.

7. The method according to claim 2, wherein the first color is a metallic color or a solid color, wherein the second color is a metallic color or a solid color, and wherein the third color is a metallic color or a solid color.

8. The method according to claim 1, wherein a respective movement of the respective robotic arm and/or of the respective spraying tool controlled by the control installation is synchronized with a movement of the outer skin component caused by the conveying system.

9. The method according to claim 1, wherein a fourth robotic arm having a fourth spraying tool is kept ready and wherein the fourth robotic arm and the fourth spraying tool is used by the control installation in an event of a failure of one of the first and second robotic arms and/or of one of the first and second spraying tools.

* * * * *